(12) United States Patent
Kowalkiewicz et al.

(10) Patent No.: US 8,365,136 B2
(45) Date of Patent: Jan. 29, 2013

(54) CREATING PARALLEL CONTROL FLOWS IN BUSINESS PROCESS MODELS

(75) Inventors: Marek Kowalkiewicz, St. Lucia (AU); Tobias Felbecker, Kirchheim under Teck (DE)

(73) Assignee: SAP AG, Walldorf (DE)

( * ) Notice: Subject to any disclaimer, the term of this patent is extended or adjusted under 35 U.S.C. 154(b) by 1360 days.

(21) Appl. No.: 12/045,311

(22) Filed: Mar. 10, 2008

(65) Prior Publication Data

US 2009/0228886 A1 Sep. 10, 2009

(51) Int. Cl.
*G06F 9/44* (2006.01)
(52) U.S. Cl. ........................................ 717/100
(58) Field of Classification Search .......... 717/100–103, 717/108, 121
See application file for complete search history.

(56) References Cited

U.S. PATENT DOCUMENTS

| 7,047,518 B2 * | 5/2006 | Little et al. | 717/108 |
| 7,769,698 B2 * | 8/2010 | Matic | 705/77 |
| 2007/0245297 A1 | 10/2007 | Kuester et al. | |

OTHER PUBLICATIONS

Bergmans, L.M.J., "Composing concurrent objects", S.I:s.n. (1994).
Kuester, Jochen M. et al., "Generation of Business Process Models for Object Life Cycle Compliance", BPM 2007, LNCS 4714, pp. 165-181, (2007).
Ryndina, Ksenia et al., "Consistency of Business Process Models and Object Life Cycles", MoDELS 2006 Workshops, LNCS 4364, pp. 80-90, (2007).
Kuster, J. M., et al., "Generation of Business Process Models for Object Life Cycle Compliance", Business Process Management, Lecture Notes in Computer Science, vol. 4714, Sep. 24, 2007, pp. 165-181.
Muller, D. et al., "Flexibility of Data-Driven Process Structures", Business Process Management Workshops, Lecture Notes in Computer Science, vol. 4103, Jan. 1, 2006, pp. 181-192.
Ryndina, K. et al., "Consistency of Business Process Models and Object Life Cycles", Models in Software Engineering, Lecture Notes in Computer Science, vol. 4364, Oct. 1, 2006, pp. 80-90.
Recker, J. et al., "Representation Theory Versus Workflow Patterns- The Case of BPMN", Conceptual Modeling- ER Lecture Notes in Computer Science, vol. 4215, Jan. 1, 2006, pp. 68-83.
Wahler, J. K., et al., "Business Process Management Beyond Consulting: The Technology Foundation", Zurich Research Laboratory—Business Integration Technology IBM, Jan. 1, 2008, pp. 1-25, Retrieved from the Internet: http://www.zurich.ibm.com/lkoe/teaching/ETH-BPM-Lecture-IBM.pdf, Retrieved on May 18, 2009.
Zurawski, R. et al., "Petri Nets and Industrial Applications: A tutorial", IEEE Transactions on Industrial Electronics, vol. 41, No. 6, Dec. 1, 1994, pp. 567-583.
European Search Report Received for EP Patent Application No. 09003491.9-2221, mailed on Jun. 26, 2009, pp. 1-6.

* cited by examiner

*Primary Examiner* — Anna Deng
(74) *Attorney, Agent, or Firm* — Brake Hughes Bellermann LLP (57) ABSTRACT

A system may include a composition engine that is configured to include a receiving engine that is configured to receive a series of states and transitions from an object lifecycle. The composition engine may include a computation engine that is configured to compute actions from the transitions and to compute preconditions and effects for the actions from the states. The composition engine may include a relations engine that is configured to compute relations between the actions and a parallel process engine that is configured to generate a parallel process fragment that includes at least two of the actions based on the relations between the actions.

17 Claims, 11 Drawing Sheets

CREATING PARALLEL CONTROL FLOWS IN BUSINESS PROCESS MODELS

TECHNICAL FIELD

This description relates to creating parallel control flows in business process models.

BACKGROUND

Business process models may describe a progression of tasks to reach certain business goals. These models may capture the order and requirements for execution of activities. The models may be created manually or composed automatically.

The automatic composition of existing tasks and sub-processes may be used to create new processes with existing resources to reach new business goals. When creating business processes, current composition approaches may only create sequential control flows. Thus, the results of those composition approaches for business processes may be process models with sequences of totally ordered activities. Sequences of totally ordered activities may not provide the flexibility and efficiency that is desirable in a business process model.

Consequently, it may be desirable to develop a composition approach that may do more than only create sequential control flows. It also may be desirable to develop a modeling approach to support modelers with these tasks.

SUMMARY

In one general aspect, a system may include a composition engine that is configured to include a receiving engine that is configured to receive a series of states and transitions from an object lifecycle. The composition engine may include a computation engine that is configured to compute actions from the transitions and to compute preconditions and effects for the actions from the states. The composition engine may include a relations engine that is configured to compute relations between the actions and a parallel process engine that is configured to generate a parallel process fragment that includes at least two of the actions based on the relations between the actions.

Implementations may include one or more of the following features. For example, the parallel process engine may be configured to generate the parallel process fragment, where the parallel process fragment includes a set of the actions, a set of parallel control flow nodes, a set of input states using the preconditions, and a set of output states using the effects. The parallel process engine may be further configured to generate a process model that includes the parallel process fragment. The parallel process engine may be further configured to generate a process model that includes the actions, the preconditions, the effects and the parallel process fragment.

The parallel process engine may be configured to generate the parallel process fragment by determining that two of the actions belong to a same object and determining that each of the two actions are direct predecessor actions of each other based on the computed relations between the actions. The parallel process engine may be configured to generate the parallel process fragment by determining that a first action and a sequentially ordered series of other actions belong to a same object lifecycle and determining that the first action and the sequentially ordered series of other actions are direct predecessor actions of each other based on the computed relations between the actions.

The parallel process engine may be configured to generate the parallel process fragment by determining that more than two actions belong to a same object lifecycle and determining that each of the more than two actions are direct predecessor actions of each other based on the computed relations between the actions. The parallel process engine may be arranged and configured to generate the parallel process fragment by determining that a first action belongs to a first object lifecycle and a second action belongs to a second object lifecycle and determining that no dependencies exist between at least the first action and other actions of the second object lifecycle based on the computed relations between the actions.

In another general aspect, a computer program product for generating parallel process fragments for a process model may be tangibly embodied on a computer-readable medium and include executable code that, when executed, is configured to cause at least one data processing apparatus to execute a composition engine. The composition engine may be configured to receive a series of states and transitions from an object lifecycle, compute actions from the transitions, compute preconditions and effects for the actions from the states, compute relations between the actions, and generate a parallel process fragment that includes at least two of the actions based on the relations between the actions. Implementation may includes one or more of the features mentioned above and described in detail below.

In another general aspect, a method may include receiving a series of states and transitions from an object lifecycle, computing actions from the transitions, computing preconditions and effects for the actions from the states, computing relations between the actions, and generating a parallel process fragment that includes at least two of the actions based on the relations between the actions. Implementations may include one or more of the features mentioned above and described in detail below.

The details of one or more implementations are set forth in the accompanying drawings and the description below. Other features will be apparent from the description and drawings, and from the claims.

DETAILED DESCRIPTION

Figure 1:
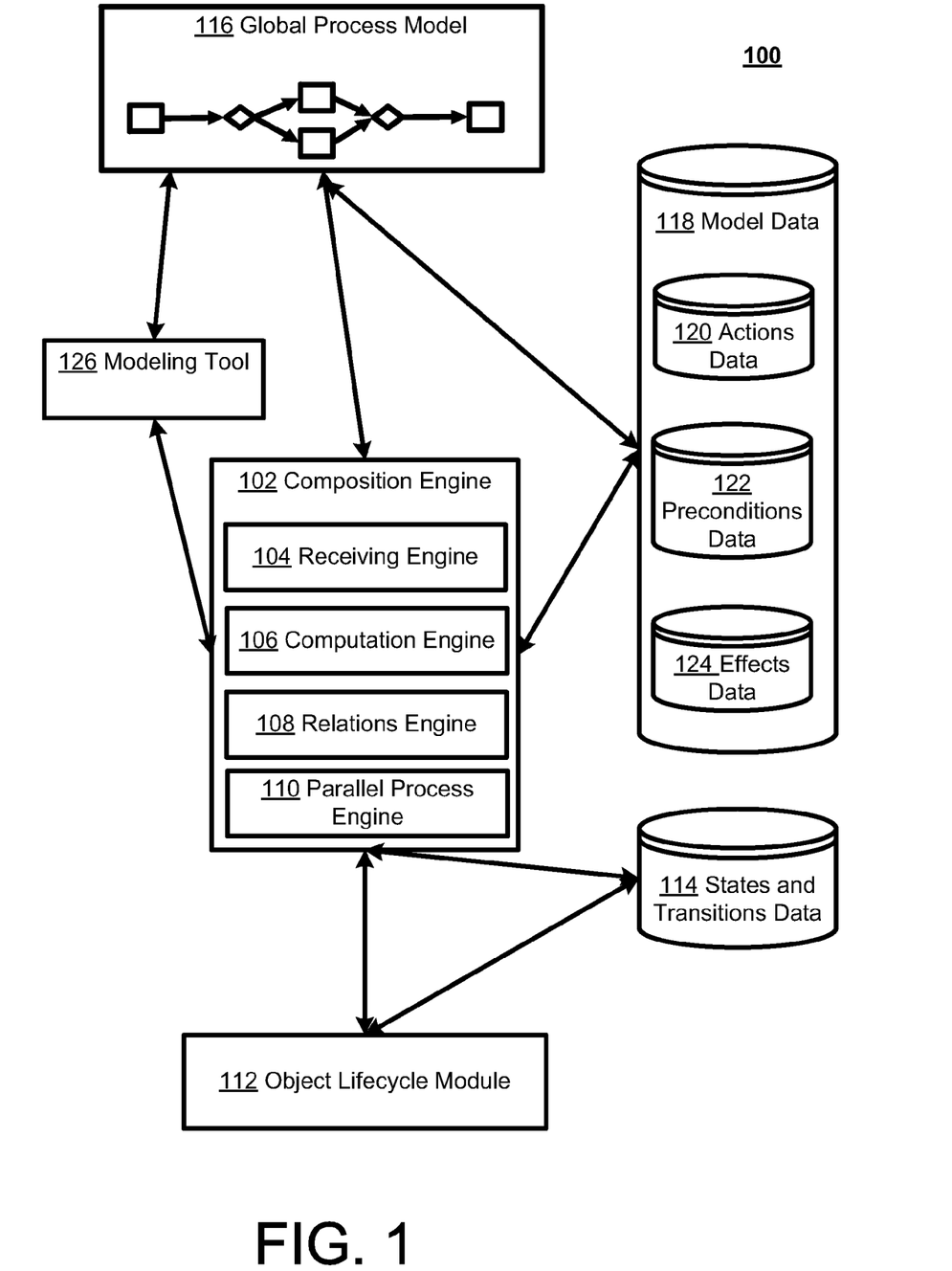
FIG. 1 is a block diagram of a system for generating parallel process fragments in process models.

FIG. 1 is a block diagram of a system 100 for generating parallel process fragments in process models. For example, the system 100 allows for the creation of a process model from an Object Life Cycles (OLC) model. An OLC model may be a modeling means for explicitly modeling allowed state transitions of an object during its existence. Reference OLC may be used to represent an established way of manipulating objects in a particular industry.

System 100 enables the generation of a compliant business process model from a set of given reference OLC, where the generated business process model includes parallel control flows of activities. System 100 generates parallel control flows to enable the potential for multiple activities to be executed simultaneously. As a result, system 100 may provide an increase in performance during execution of the generated business process model and an increase in the flexibility of the execution. Consequently, the system 100 provides workflow designers and users with the ability to implement workflow process models in a manner that more accurately and completely reflects real-world usage scenarios that include parallel control flows that enable the parallel execution of activities, instead of just sequential control flows, which do not enable the parallel execution of activities.

In one exemplary implementation, system 100 may generate parallel process fragments using existing business process models. For example, system 100 may recompose an existing business process model without parallel control flow into a new business process model that includes parallel control flow. As a result, system 100 may improve the efficiency of an existing business process model by reconfiguring the business process model to include parallel control flow.

In one exemplary implementation, system 100 may be configured for implementation with any type of graphical process modeling notation including, for example, business process modeling notation (BPMN) and other graphical process modeling notations. In other exemplary implementations, system 100 may be configured for implementation with non-graphical process modeling notation such as text-based process modeling notations.

In the example of FIG. 1, a composition engine 102 may be arranged and configured to generate parallel process fragments using a given set of reference OLC and/or using an existing business process model. The composition engine 102 may include a receiving engine 104, a computation engine 106, a relations engine 108 and a parallel process engine 110. The composition engine 102 may be configured to control and cause the receiving engine 104, the computation engine 106, the relations engine 108 and the parallel process engine 110 to perform their respective functions. Thus, the composition engine 102 may be a fully automated engine that may perform its functions, including the functions of the various engines that are a part of the composition engine 102, without any manual intervention or invocation.

In one exemplary implementation, the receiving engine 104 may be arranged and configured to receive a series of states and transitions from an object lifecycle. An object lifecycle may be a model that captures allowed states and state transitions for a particular object type. An object lifecycle may be modeled using a non-deterministic finite state machine. The receiving engine 104 may receive the states and transitions for the object lifecycle from an object lifecycle module 112 and/or a states and transitions data 114.

For instance, the object lifecycle module 112 may include a model for a business object lifecycle. The states and transitions data 114 may include a library of states and transitions that may be used by the object lifecycle module 112. In one exemplary implementation, an object lifecycle model may be created using the library of states and transitions that may be contained in the states and transitions data 114. Once the object lifecycle model has been created, the states and transition information for the particular object lifecycle model may be saved with and stored within the object lifecycle module 112.

In other exemplary implementations, the object lifecycle module 112 may include the information for a particular object lifecycle model to include the use of pointers to reference the states and transitions information that may be stored in the states and transitions data 114.

It is to be understood that the receiving engine 104 may be arranged and configured to access the desired information from the object lifecycle module 112 and/or the states and transitions data 114 and retrieve the desired information.

In another exemplary implementation, the receiving engine 104 may be arranged and configured to receive an existing business process model or portion of an existing business process model. For example, global process model 116 may be an existing business process model. The receiving engine 104 may receive actions, preconditions and/or effects associated with the global process model 116. A business process model may capture the coordination of individual activities, which also may be referred to as actions or tasks, in a particular process and can additionally show the exchange of objects between these activities.

Process tasks may be modeled using actions and coordination of steps may be done using control flow edges and control nodes such as, for example, decision and merge nodes. Data inputs and outputs of actions may be modeled with input and output pins. An action may have one pin on each side for each data object. The states of an input pin may represent the preconditions (i.e., input states), and the states of an output pin may represent the effects (i.e., output states) for that action. The effects also may be referred to as postconditions.

The receiving engine 104 may receive the actions, preconditions and/or effects associated with the global process model 116 from the global process model 116 itself and/or from the model data 118. The model data 118 may include actions data 120, preconditions data 122 and effects data 124. The model data 118 may include a library of actions in the actions data 120, a library of preconditions in the preconditions data 122 and a library of effects in the effects data 124 that may be used by the global process model 116. Although the actions data 120, the preconditions data 122 and the effects data 124 are illustrated as separate repositories, it is understood that they may be a single repository. It is also understood that they may be arranged and configured in one or more combinations of other repositories.

It is to be understood that the receiving engine 104 may access the desired information from the global process model 116 and the model data 118 and retrieve the desired information.

In the example of FIG. 1, a global process model 116 represents a business process model that may be implemented, and agreed on, by a number of collaborating service providers, such that the service providers perform activities of the global process model 116. The service providers may make pre-arrangements regarding their interactions with one another (e.g., arrangements governing messages, message formats, or message types, as well as arrangements governing an order of the messages to be sent and/or activities to be performed). By way of specific example, a purchase order may be sent by one service provider that may require either acknowledgement or rejection by one or more other service provider(s). The global process model 116 (also referred to as a global choreography model) thus provides a way of capturing, contractualizing, and implementing potentially complex and long-running message exchange sequences between service providers, in order to execute a desired business process.

The computation engine 106 may be arranged and configured to compute actions from the received transitions and to compute preconditions and effects for the actions from the received states. Thus, the computation engine 106 may use the object lifecycle information received by the receiving engine 104 to compute the actions, preconditions and effects for a business process model. For the transitions with the same action, a process action is created and the states are added to the action's input pin or output pin. In this manner, new process models may created from object lifecycle models.

The relations engine 108 may be arranged and configured to compute relations between the computed actions. For example, the relations engine 108 may use the computed preconditions and the computed effects, as computed by the computation engine 106, to determine the relations between the computed actions. For example, an action $a_1$ is a predecessor of an action $a_2$ represented as follows: $a_1 < a_2$ or prec $(a_2)=a_1$ if outstate$(a_1)$ ∩ instate$(a_2) \neq \emptyset$; where instate(a) is the set of input states of a and outstate(a) is the set of output states of a. S is a set of states S=outstate$(a_1)$ ∩ instate$(a_2)$ and $a_1$ provides S for $a_2$, written $a_1 <^s a_2$.

In one exemplary implementation, the relations engine 108 may use the received preconditions and the received effects, as received by the receiving engine 104 from a global process model 116 and/or the model data 118, to determine the relations between the received actions. In this manner, the computation engine 106 may not be a part of the process, because the beginning model was already a business process model. Thus, the actions, preconditions and effects would not need to be computed.

The parallel process engine 110 may be arranged and configured to generate a parallel process fragment that includes at least two of the actions based on the relations between the actions. The parallel process engine 110 uses the relations between actions, as determined by the relations engine 108, to generate the parallel process fragment. Thus, the parallel process engine 110 may generate the parallel process fragment from what was originally a sequentially ordered object lifecycle.

In one exemplary implementation, the parallel process engine 110 may generate the parallel process fragment from what was originally a sequentially ordered business process model. Thus, the parallel process engine 110 may use the relations between actions in the sequentially ordered business process model to recompose the sequentially ordered business process model to include parallel process fragments.

The composition engine 102 may be configured to add the parallel process fragment generated by the parallel process engine 110 to a business process model computed from the object lifecycle. In one exemplary implementation, the composition engine 102 may be configured to add the parallel process fragment generated by the parallel process engine 110 to a recomposed business process model, where the parallel process fragment replaces at least two actions that were previously sequentially ordered with actions that are in parallel.

A parallel process fragment may be a sub-process that includes a set of actions, parallel control flow nodes, a set of input states and a set of output states. The parallel process fragment may be represented by the notation PPF ($A_{PPF}$, P, $I_{PPF}$, $O_{PPF}$), where $A_{PPF}$ represents the set of actions, P represents the parallel control flow nodes, $I_{PPF}$ represents the set of input states and $O_{PPF}$ represents the set of output states.

System 100 also may include a modeling tool 126. The modeling tool 126 may be used by a process designer (also referred to as a process modeler) to enable the process designer to design process models. In one exemplary implementation, the modeling tool 126 may invoke the composition engine 102 to begin an automated process of converting a sequentially ordered object lifecycle into a business process model that includes parallel control flows. In another exemplary implementation, the modeling tool 126 may invoke the composition engine 102 to recompose an existing sequentially ordered business process model into a new business process model that includes parallel control flows.

Figure 2:
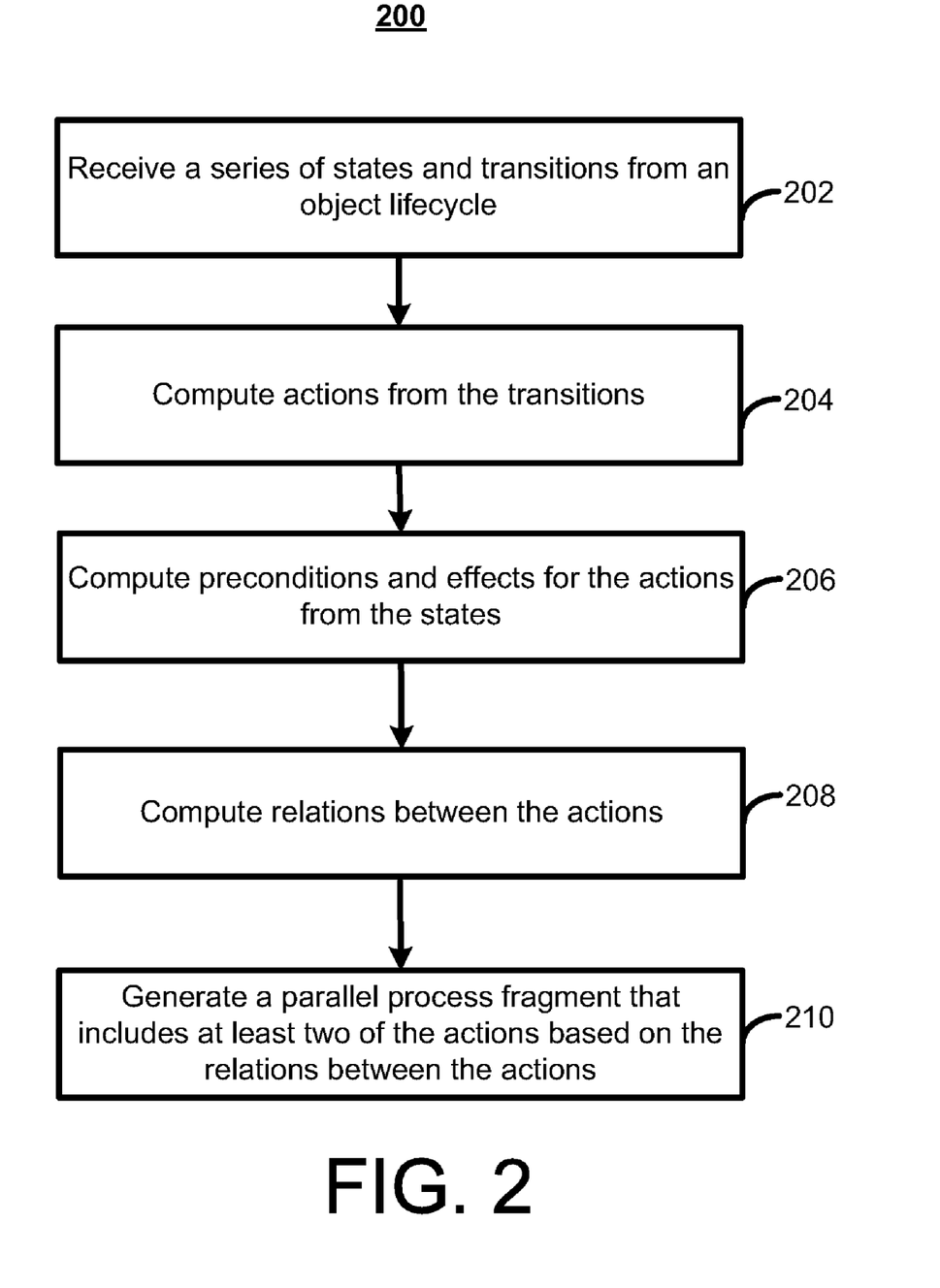
FIG. 2 is a flowchart illustrating example operations of the system of FIG.

Referring to FIG. 2, a process 200 illustrates example operations of the system 100 of FIG. 1. Process 200 may include receiving a series of states and transitions from an object lifecycle (202), computing actions from the transitions (204), computing preconditions and effects for the actions from the states (206), computing relations between the actions (208) and generating a parallel process fragment that includes at least two of the actions based on the relations between the actions (210).

Process 200 may include receiving a series of states and transitions from an object lifecycle (202). For example, the receiving engine 104 may be configured to receive the series of states and transitions from the object lifecycle (202). As discussed above with respect to FIG. 1, the receiving engine 104 may receive this information from the object lifecycle module 112 and/or the states and transitions data 114. Additionally and/or alternatively, the receiving engine 104 may access and retrieve the information from the object lifecycle module 112 and/or the states and transitions data 114.

Process 200 may include computing actions from the transitions (204). For example, the computation engine 106 may be configured to compute actions from the received transitions (204). Process 200 may include computing preconditions and effects for the actions from the states (206). For example, the computation engine 106 may be configured to compute the preconditions and effects for the actions from the states (206).

Process 200 may include computing relations between the actions (208). For example, the relations engine 108 may be configured to compute the relations between the actions (208). As discussed above with respect to FIG. 1, the relations engine 108 may use the computed preconditions and the computed effects, as computed by the computation engine 106, to determine the relations between the computed actions.

Process 200 may include generating a parallel process fragment that includes at least two of the actions based on the relations between the actions (210). For example, the parallel process engine 110 may generate the parallel process fragment that includes at least two of the actions based on the relations between the actions (210). As discussed above with respect to FIG. 1, the parallel process engine 110 may use the relations between actions as determined by the relations engine 108 to generate the parallel process fragment.

Thus, process 200 may be an automated process that converts an object lifecycle model to a business process model, where the business process model includes parallel activities. Process 200 enables the generation of parallel process fragments such that multiple activities may be executed simultaneously.

Figure 3:
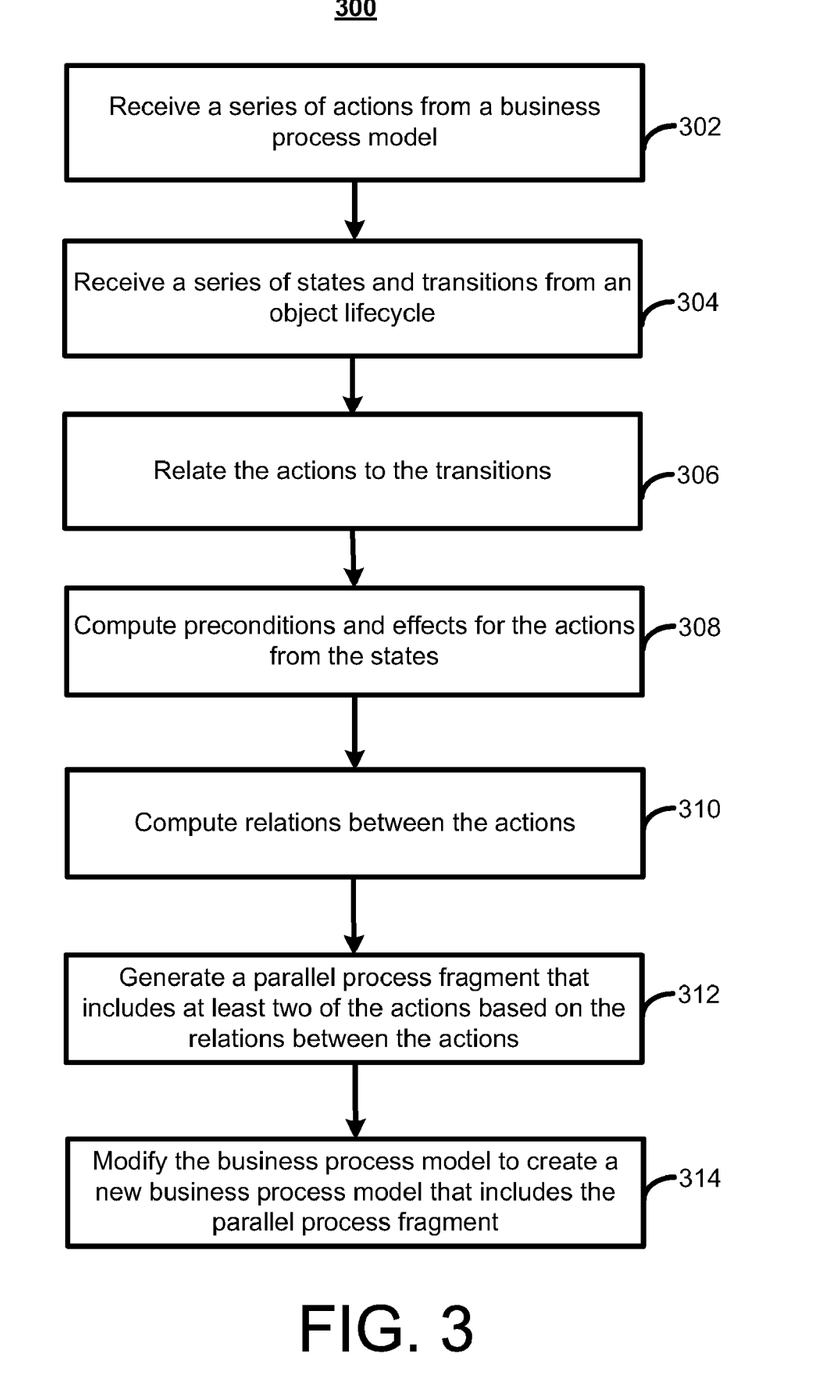
FIG. 3 is a flowchart illustrating example operations of the system of FIG.

Referring to FIG. 3, a process 300 illustrates example operations of the system 100 of FIG. 1. Process 300 may include receiving a series of actions from a business process model (302), receiving a series of states and transitions from an object lifecycle (304), relating the actions to the transitions (306); computing preconditions and effects for the actions from the states (308); computing relations between the actions (310), generating a parallel process fragment that includes at least two of the actions based on the relations between the actions (312) and modifying the business process model to create a new business process model that includes the parallel process fragment (314).

Process 300 may include receiving a series of actions from a business process model (302). For example, the receiving engine 104 may be configured to receive the series of actions from the business process model (302). As discussed above with respect to FIG. 1, the receiving engine 104 may receive this information from the global process model 116 and/or the model data 118. Additionally and/or alternatively, the receiving engine 104 may access and retrieve the information from the global process model 116 and/or the model data 118.

Process 300 may include receiving a series of states and transitions from an object lifecycle (304). For example, the receiving engine 104 may be configured to receive the series of states and transitions from the object lifecycle (304). As discussed above with respect to FIG. 1, the receiving engine 104 may receive this information from the object lifecycle module 112 and/or the states and transitions data 114. Additionally and/or alternatively, the receiving engine 104 may access and retrieve the information from the object lifecycle module 112 and/or the states and transitions data 114.

Process 300 may include relating the actions to the transitions (306). For example, the relations engine 108 may be configured to relate the actions to the transitions (306). Process 300 may include computing preconditions and effects from the actions from the states (308). For example, the computation engine 106 may be configured to compute the preconditions and the effects for the actions from the states (308). The computation engine 106 may use the information received by the receiving engine 104 to compute the preconditions and the effects for the actions from the states.

Process 300 may include computing relations between the actions (310). For example, the relations engine 108 may be configured to compute the relations between the actions (310). As discussed above with respect to FIG. 1, the relations engine 108 may use actions, preconditions and effects received from the global process model 116 and/or received from the model data 118 to determine the relations between the computed actions.

Process 300 may include generating a parallel process fragment that includes at least two of the actions based on the relations between the actions (312). For example, the parallel process engine 110 may generate the parallel process fragment that includes at least two of the actions based on the relations between the actions (312). As discussed above with respect to FIG. 1, the parallel process engine 110 may use the relations between actions as determined by the relations engine 108 to generate the parallel process fragment.

Process 300 may include modifying the business process model to create a new business process model that includes the parallel process fragment (314). For example, the composition engine 102 may be configured to modify the business process model to create the new business process model that includes the parallel process fragment (314). Thus, process 300 may be an automated process that converts an existing business process model to a business process model that includes parallel activities. Process 300 may take a business process model that includes only sequential process flows and generate parallel process fragments to replace at least two of the actions with a parallel process fragment. Process 300 enables the generation of parallel process fragments such that multiple activities may be executed simultaneously. Process 300 may be beneficial to a modeler by improving efficiencies within a business process model that has already been created.

Figure 4:
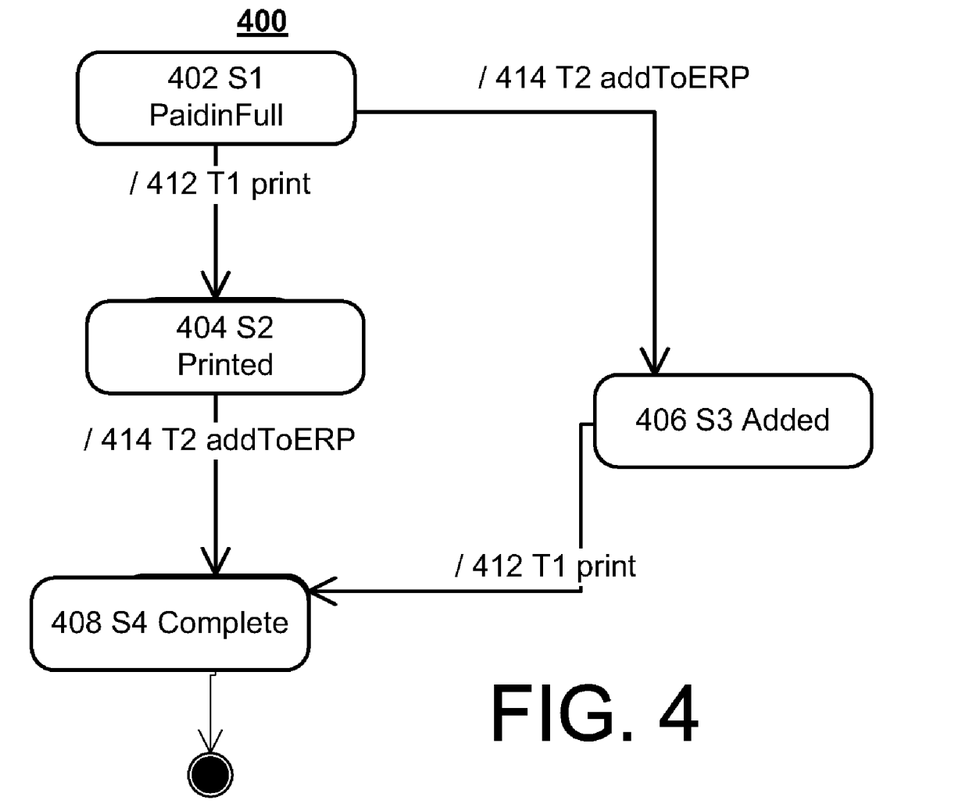
FIG. 4 is a portion of an exemplary object lifecycle model.

Referring to FIG. 4, a portion of an example object lifecycle 400 is illustrated. Object lifecycle 400 includes the states of S1 "Paid in Full" 402, S2 "Printed" 404, S3 "Added" 406 and S4 "Complete" 408. Object lifecycle 400 also includes the transitions T1 "/Print" 412 and T2 "/addtoERP" 414.

In the example of FIG. 4, the composition engine 102 may be used to automatically determine whether or not any of the transitions from the object lifecycle 400 may be converted into one or more parallel process fragments as part of a conversion to a business process model. The receiving engine 104 may receive the states S1 402, S2 404, S3 406 and S4 408. The receiving engine 104 also may receive the transitions T1 412 and T2 414.

The computation engine 106 may compute actions from the transitions T1 412 and T2 414. The computed actions may be A1 "Print" and A2 "addtoERP". The computation engine 106 also may compute preconditions and effects for the actions, A1 and A2, using the states S1 402, S2, 404 and S3 406. In this example, the precondition for actions A1 and A2 may be "PaidinFull". The effect for action A1 may be "Printed" and the effect for action A2 may be "Added".

The relations engine 108 may compute relations between the actions A1 and A2. In this example, action A1 is a direct predecessor of action A2 and vice versa because the effects of action A1 are preconditions of action A2 and the effects of action A2 are preconditions of action A1.

The parallel process engine 110 may be configured to generate a parallel process fragment based on the relations between the actions computed by the relations engine 108. The parallel process engine 110 may determine that the actions A1 and A2 both belong to the same business object. The parallel process engine 110 also may determine that each of the actions A1 and A2 are direct predecessor actions of each other.

The parallel process engine 110 may determine the preconditions and effects that concatenate action A1 and action A2. The parallel process engine 110 may make this determination by taking the intersection of the effects of action A1 and the preconditions of action A2 and the intersection of the effects of action A2 and the preconditions of action A1. Those states may be called concatenating states.

The parallel process engine 110 generates the parallel process fragment with action A1 and action A2 as parallel branches. The preconditions for the entire parallel process fragment are the union of the preconditions of action A1 and action A2 without the union of concatenating states. The effects of the entire parallel process fragment are the union of the effects of action A1 and action A2 without the concatenating states.

In this example, the rule applied by the parallel process engine 110 may be expressed as follows: Two parallel actions may be created if there are two actions $a_1$, $a_2$ and $a_1 <^{S1} a_2$ and $a_2 <^{S2} a_1$ then the parallel process fragment (PPF) may be created with $a_1$ and $a_2$ as parallel branches. The input and output states of the parallel process fragment are as follows, $I_{PPF} = \{instate(a_1) \cup instate(a_2)\} \backslash \{S_1 \cup S_2\}$ and $O_{PPF} = \{outstate(a_1) \cup outstate(a_2)\} \backslash \{S_1 \cup S_2\}$. The rule may be programmed as part of the parallel process engine 110 such that the rule may be applied whenever the parallel process engine 110 may be generating parallel process fragments.

Figure 5:
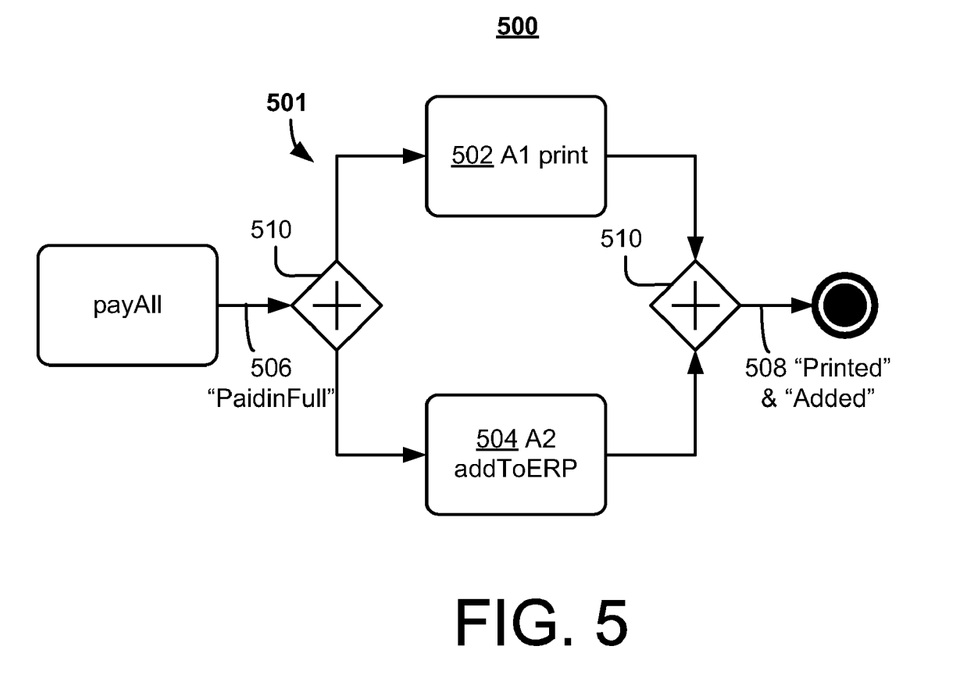
FIG. 5 is a portion of an exemplary business process model with a parallel process fragment generated from the object lifecycle model of FIG. 4 using the system of FIG. 1.

Referring to FIG. 5, an example portion of a business process model 500 is illustrated. The business process model 500 includes the parallel process fragment 501 that was generated from the object lifecycle 400 of FIG. 4 using system 100 of FIG. 1 and process 200 of FIG. 2. The parallel process fragment 501 includes parallel actions A1 502 "Print" and A2 504 "addToERP". The input state for the parallel process fragment 501 is "PaidinFull" 506 and the output state is "Printed" and "Added" 508. The parallel process fragment includes a set of parallel control flow nodes 510.

In this example, it doesn't matter what order the actions A1 502 and A2 504 are performed in relation to each other. Thus, these actions can be performed in any order, either separately or simultaneously. The conversion of the object lifecycle to a process model with a parallel process fragment 501 provides increased flexibility and increased efficiency when compared to an object lifecycle that is converted to a totally sequentially ordered process model.

Figure 6:
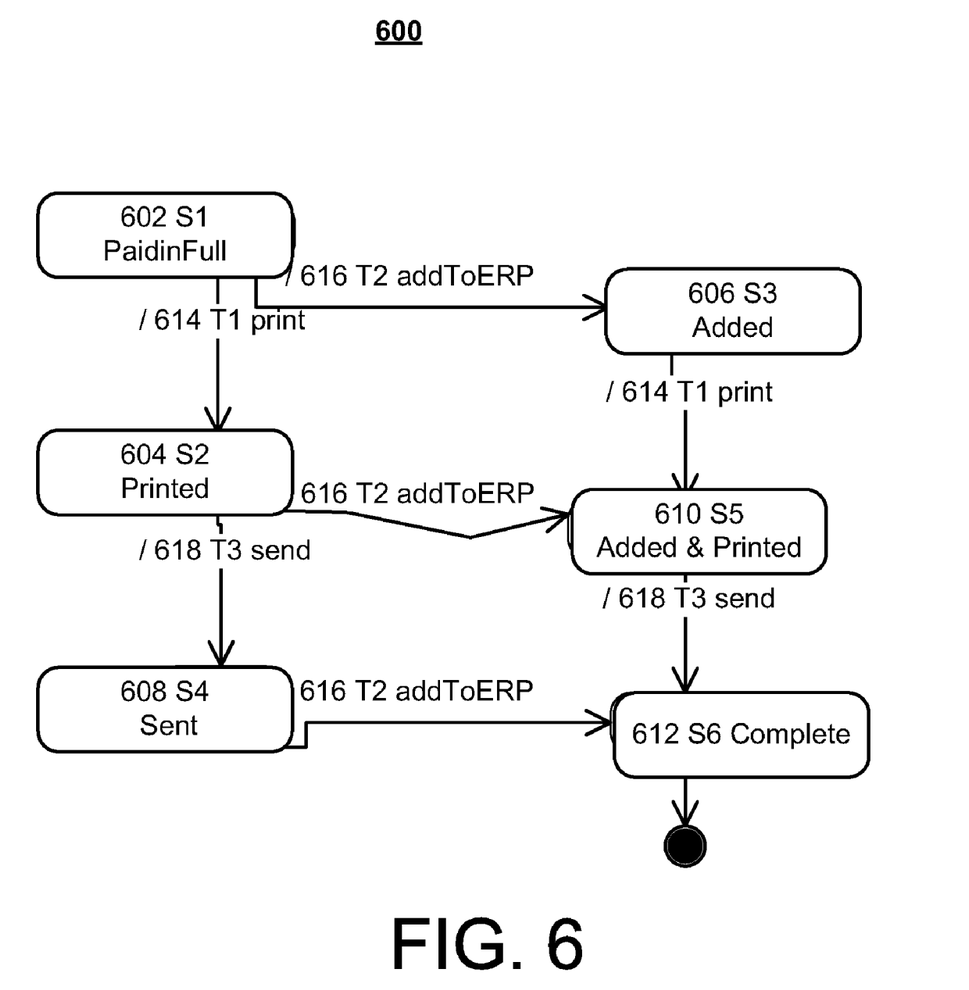
FIG. 6 is a portion of an exemplary object lifecycle model.

Referring to FIG. 6, a portion of an example object lifecycle 600 is illustrated. Object lifecycle 600 includes the states of S1 "Paid in Full" 602, S2 "Printed" 604, S3 "Added" 606, S4 "Sent" 608, S5 "Added & Printed" 610 and S6 "Complete" 612. Object lifecycle 600 also includes the transitions T1 "/print" 614, T2 "/addtoERP" 616, and T3 "/send" 618.

In the example of FIG. 6, the composition engine 102 may be used to automatically determine whether or not any of the transitions from the object lifecycle 600 may be converted into one or more parallel process fragments as part of a conversion to a business process model. The receiving engine 104 may receive the states S1-S6 602-612. The receiving engine 104 also may receive the transitions T1 614, T2 616 and T3 618.

The computation engine 106 may compute actions from the transitions T1 614, T2 616 and T3 618. The computed actions may be A1 "Print", A2 "addtoERP" and A3 "send". The computation engine 106 also may compute preconditions and effects for the actions, A1, A2 and A3, using the states S1-S6 602-612. In this example, the precondition for actions A1 and A2 may be "PaidinFull". The precondition for the action A3 may be "Printed", which is the effect for action A1. The effect for action A2 may be "Added" and the effect for action A3 may be "Sent".

The relations engine 108 may compute relations between the actions A1, A2 and A3. In this example, there is an ordered sequence of actions for A1 and A3 because the effects of A1 are the preconditions of the action A2.

The parallel process engine 110 may be configured to generate a parallel process fragment based on the relations between the actions computed by the relations engine 108. The parallel process engine 110 may determine that the actions A1, A2 and A3 belong to the same business object. The parallel process engine 110 also may determine that action A2 is not part of the ordered sequence of actions. Action A2 is a direct predecessor to each of the actions in the ordered sequence, A1 and A3, and each of the actions in the ordered sequence is a direct predecessor to this separate action, A2 because the effects of action A2 are preconditions of actions A1 and A2 and vice versa.

The parallel process engine 110 may determine that the states that concatenate two actions, A1 and A3, are concatenating states because the states are the effects of one action, A1, and also the preconditions of the other action, A3. The parallel process engine 110 generates the parallel process fragment with action A2 as one branch and the ordered sequence of actions A1 and A3 as the other branch. The result is that action A2 is in parallel with the ordered sequence of actions A1 and A3. The preconditions for the entire parallel process fragment are the union of the preconditions of actions A1, A2 and A3, without the union of concatenating states. The effects of the entire parallel process fragment are the union of the effects of actions A1, A2 and A3, without the concatenating states.

In this example, the rule applied by the parallel process engine 110 may be expressed as follows: A sequence of ordered actions may be created in parallel with another action if there exist an action $a \in N_A$ and two or more actions $b_1 \ldots b_n \in N_A$ where $b_1 <^{Sb1} \ldots <^{Sbn} b_n$. If to a $\{\exists a \in N_A, \forall b \in \{b_1 \ldots b_n\} | a <^{Sa1} b \hat{} b <^{Sa2} a\}$ then the parallel process fragment (PPF) may be created with a as a parallel branch and the sequence of $b_1 \ldots b_n$ as another parallel branch. The input and output states of the parallel process fragment are as follows, $I_{PPF} = \{instate(a) \cup instate(b_1) \cup \ldots \cup instate(b_n)\} \setminus \{S_{a1} \cup S_{a2} \cup S_{b1} \cup \ldots \cup S_{bn}\}$ and $O_{PPF} = \{outstate(a) \cup outstate(b_1) \cup \ldots \cup outstate(b_n)\} \setminus \{S_{a1} \cup S_{a2} \cup S_{b1} \cup \ldots \cup S_{bn}\}$. The rule may be programmed as part of the parallel process engine 110 such that the rule may be applied whenever the parallel process engine 110 may be generating parallel process fragments.

Figure 7:
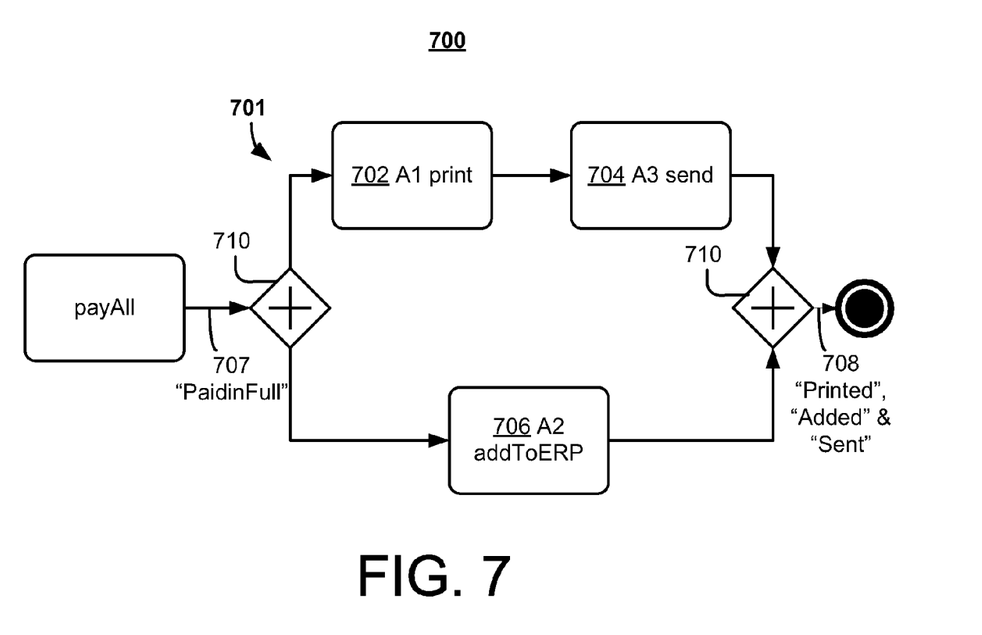
FIG. 7 is a portion of an exemplary business process model with a parallel process fragment generated from the object lifecycle model of FIG. 6 using the system of FIG. 1.

Referring to FIG. 7, an example portion of a business process model 700 is illustrated. The business process model 700 includes the parallel process fragment 701 that was generated from the object lifecycle 600 of FIG. 6 using system 100 of FIG. 1 and process 200 of FIG. 2. The parallel process fragment 701 includes sequentially ordered actions A1 702 "Print" and A3 704 "send", which are in parallel with action A2 706 "addToERP". The input state for the parallel process fragment 701 is "PaidinFull" 707 and the output state is "Printed", "Added" and "Sent" 708. The parallel process fragment includes a set of parallel control flow nodes 710.

The conversion of the object lifecycle to a process model with a parallel process fragment 701 provides increased flexibility and increased efficiency when compared to an object lifecycle that is converted to a totally sequentially ordered process model.

Figure 8:
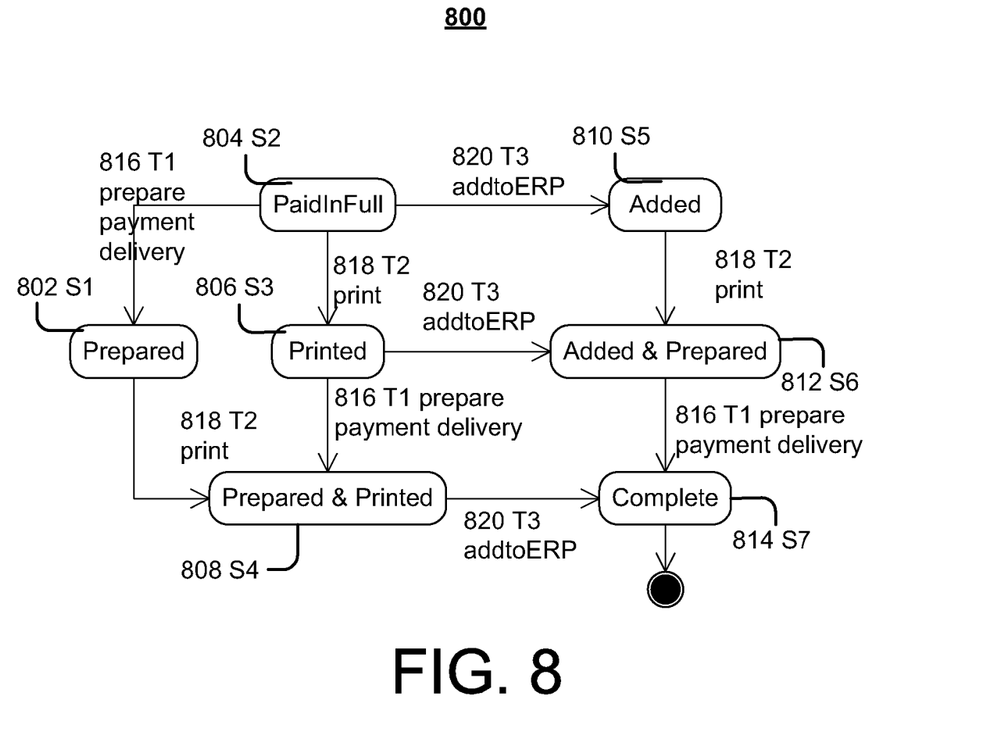
FIG. 8 is a portion of an exemplary object lifecycle model.

Referring to FIG. 8, a portion of an example object lifecycle 800 is illustrated. Object lifecycle 800 includes the states of S1 "Prepared" 802, S2 "Paid in Full" 804, S3 "Printed" 806, S4 "Prepared & Printed" 808, S5 "Added" 810, S6 "Added & Prepared" 812, and S7 "Complete" 814. Object lifecycle 800 also includes the transitions T1 "prepare payment delivery" 816, T2 "print" 818, and T3 "addtoERP" 820.

In the example of FIG. *, the composition engine 102 may be used to automatically determine whether or not any of the transitions from the object lifecycle 800 may be converted into one or more parallel process fragments as part of a conversion to a business process model. The receiving engine 104 may receive the states S1-S7 802-814. The receiving engine 104 also may receive the transitions T1 816, T2 818 and T3 820.

The computation engine 106 may compute actions from the transitions T1 816, T2 818 and T3 820. The computed actions may be A1 "Prepare Payment Delivery", A2 "Print", and A3 "addtoERP". The computation engine 106 also may compute preconditions and effects for the actions, A1, A2 and A3, using the states S1-S7 802-814.

The relations engine 108 may compute relations between the actions A1, A2 and A3. In this example, if there are several actions and each action is the direct predecessor of each other action and vice versa, then a parallel process fragment may be created with a parallel branch for each of the actions. An action is a predecessor of another action if the effects of the one action are the preconditions of the other action.

The parallel process engine 110 may be configured to generate a parallel process fragment based on the relations between the actions computed by the relations engine 108.

The parallel process engine 110 may determine that the actions A1, A2 and A3 belong to the same business object. The parallel process engine 110 also may determine that each action is the direct predecessor of each other action and vice versa. Actions A1, A2 and A3 are each direct predecessors to one another.

The parallel process engine 110 may determine that the states that concatenate the actions, A1, A2 and A3 are concatenating states because the states are the effects of one action and are also the preconditions of the other action. The parallel process engine 110 generates the parallel process fragment with each of the actions as a branch that is parallel to one another. The result is that actions A1, A2 and A3 are in parallel with each other. The preconditions for the entire parallel process fragment are the union of the preconditions of actions A1, A2 and A3, without the union of concatenating states. The effects of the entire parallel process fragment are the union of the effects of actions A1, A2 and A3, without the concatenating states.

In this example, the rule applied by the parallel process engine 110 may be expressed as follows: More than two actions may be created in parallel if there is a set of actions $N_A=\{a_1 \ldots a_n | n>2\}$ and $A_{parallel}=\{\forall a_i \in N_A, \forall a_j \in N_A | a_i \neq a_j, a_i <^{Sai} a_j \wedge a_j <^{Saj} a_i\}$ then the parallel process fragment (PPF) may be created with parallel branches for each $a \in A_{paraallel}$. The input and output states of the parallel process fragment are as follows, $I_{PPF}=\{instate(a_1) \cup \ldots \cup instate(a_n)\} \setminus \{S_{ai} \cup \ldots \cup S_{aj}\}$ and $O_{PPF}=\{outstate(a_1) \cup \ldots \cup outstate(a_n)\} \setminus \{S_{ai} \cup \ldots \cup S_{aj}\}$. The rule may be programmed as part of the parallel process engine 110 such that the rule may be applied whenever the parallel process engine 110 may be generating parallel process fragments.

Figure 9:
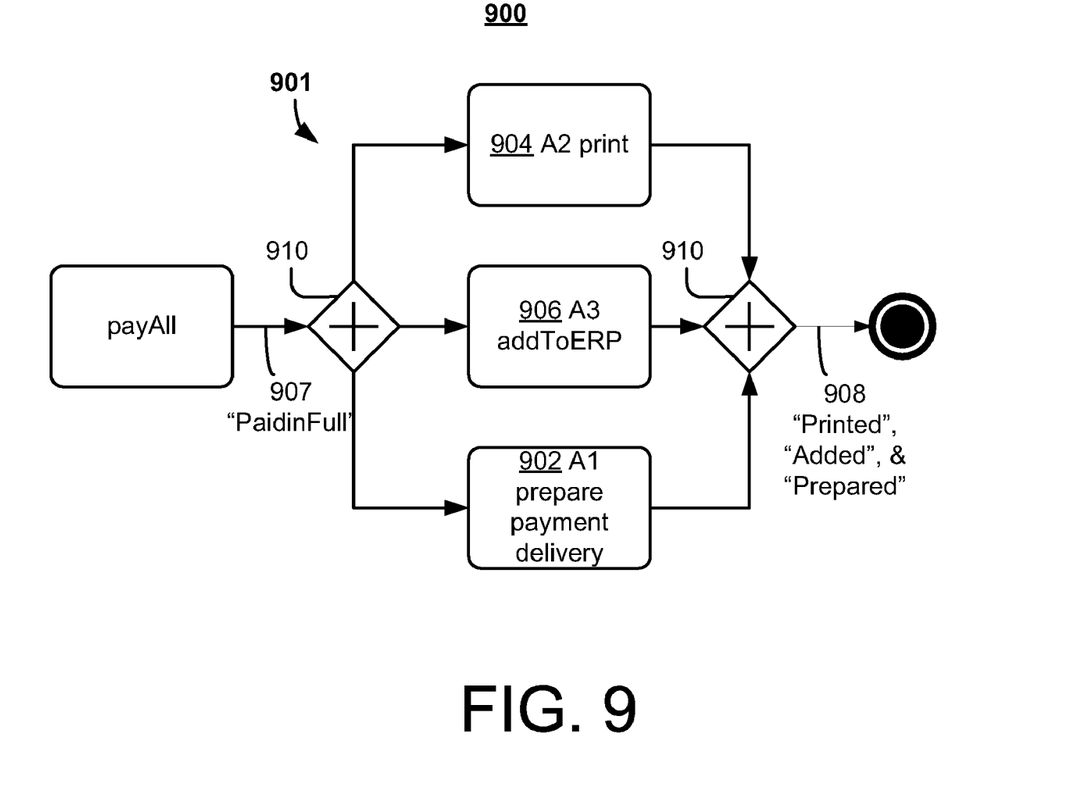
FIG. 9 is a portion of an exemplary business process model with a parallel process fragment generated from the object lifecycle model of FIG. 8 using the system of FIG. 1.

Referring to FIG. 9, an example portion of a business process model 900 is illustrated. The business process model 900 includes the parallel process fragment 901 that was generated from the object lifecycle 800 of FIG. 8 using system 100 of FIG. 1 and process 200 of FIG. 2. The parallel process fragment 901 includes parallel actions A1 902 "prepare payment delivery", A2 904 "Print" and A3 906 "addtoERP". The input state for the parallel process fragment 901 is "PaidinFull" 907 and the output state is "Printed", "Added" and "Prepared" 908. The parallel process fragment includes a set of parallel control flow nodes 910.

The conversion of the object lifecycle to a process model with a parallel process fragment 901 provides increased flexibility and increased efficiency when compared to an object lifecycle that is converted to a totally sequentially ordered process model.

With respect to the rules discussed above, the parallel process engine 110 may use one or more of the rules in any combination when generating parallel process fragments.

Figure 10:
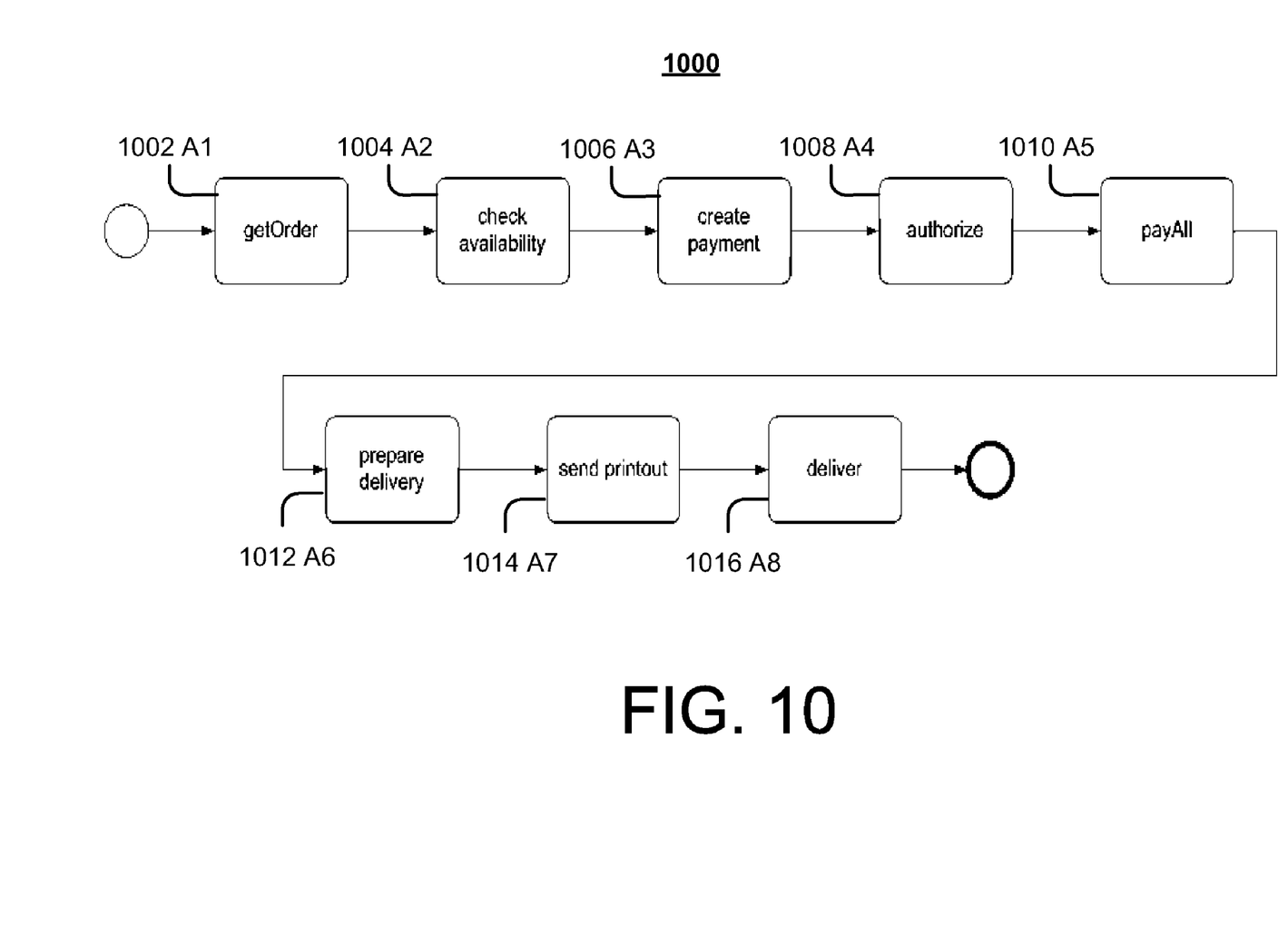
FIG. 10 is a portion of an exemplary sequentially ordered business process model.

Referring to FIG. 10, a portion of an example business process model 1000 is illustrated. Business process model 1000 includes a sequentially ordered series of actions that were created from two separate business object lifecycles. This sequence 1000 lacks parallel control flow. Business process model 1000 includes actions A1 1002 "getOrder", A2 1004 "check availability", A3 1006 "create payment", A4 1008 "authorize", A5 1010 "payAll", A6 1012 "prepare delivery", A7 1014 "send printout" and A8 1016 "deliver". Actions A1 1002, A2 1004, A6 1012 and A8 1016 may have been originated from an "order" business object. Actions A3 1006, A4 1008, A5 1010, and A7 1014 may have originated from a "payment" business object.

In the example of FIG. 10, the composition engine 102 may be used to automatically determine whether or not any of the existing actions in the sequentially ordered business process model 1000 may be converted into one or more parallel process fragments. The receiving engine 104 may receive the series of actions A1-A8 1002-1016 and any associated preconditions and effects for those actions.

The relations engine 108 may compute relations between the actions A1-A8 1002-1016. In this example, since there are two business objects, a synchronization constraint between the two business objects may be used. A function sync: Transition→State where a transition t can only fire if the sync(t) belongs to the current state of the world. Thus, for this example: sync(createPayment)=O[Available] and sync(prepareDelivery)=P[PaidInFull]. In other words, there are two business objects, order and payment, and the action createPayment on object payment can be performed only when the object order is in the state Available. Similarly, the action prepareDelivery on object order can be performed only when Payment is PaidinFull.

The parallel process engine 110 may be configured to generate a parallel process fragment based on the relations between the actions computed by the relations engine 108. The parallel process engine 110 may define a totally ordered sequence as follows: A sequence $Seq(A_{seq}, order_{seq})$ consists of the set of actions $A_{seq}$ and an ordering function $order_{seq}$. If $aj \in order_{seq}(a_i)$, then $a_i \triangleleft a_j$. The state of the world $s_{sotw}$ is a global set of object states. Pred(a) is a function pred:action actions that returns the set of all predecessors of a. Instate(a) and outstate(a) are functions instate, outstate:action→states that return the set of states of a that are its preconditions or effects.

The parallel process engine 110 may generate a new process model that allows parallel control flow. Actions may be added to the new sequence, step by step. The parallel process engine 110 may generate the parallel process fragment by applying any one or combination of the rules discussed above. In each step, the parallel process engine 110 seeks actions that hit the following condition: $A_{step}=\{\forall a \in A_{seq} | (pred(a)=\emptyset \wedge (sync(a)=\emptyset \vee sync(a) \subseteq s_{sotw})) \vee (pred(a) \neq \emptyset \wedge instate(a) \subseteq s_{sotw} \wedge sync(a) \subseteq s_{sotw})\}$. For each $a \in A_{step}$, the parallel process engine 110 adds a parallel branch to a parallel process fragment and adds it to the new sequence. If $|A_{step}|=1$, only the single action is added. The parallel process engine 110 may update the state of the world respective to outstate(a). Then, $A_{step}$ may be removed from $A_{seq}$ and the step may be repeated again with the new state of the world until $A_{seq}$ is empty. If there is a sequence Seq, the parallel process engine 110 may apply this parallelization mechanism to Seq and an initial state of the World $s_{init}$ and receive a process model with parallel control flow.

Figure 11:
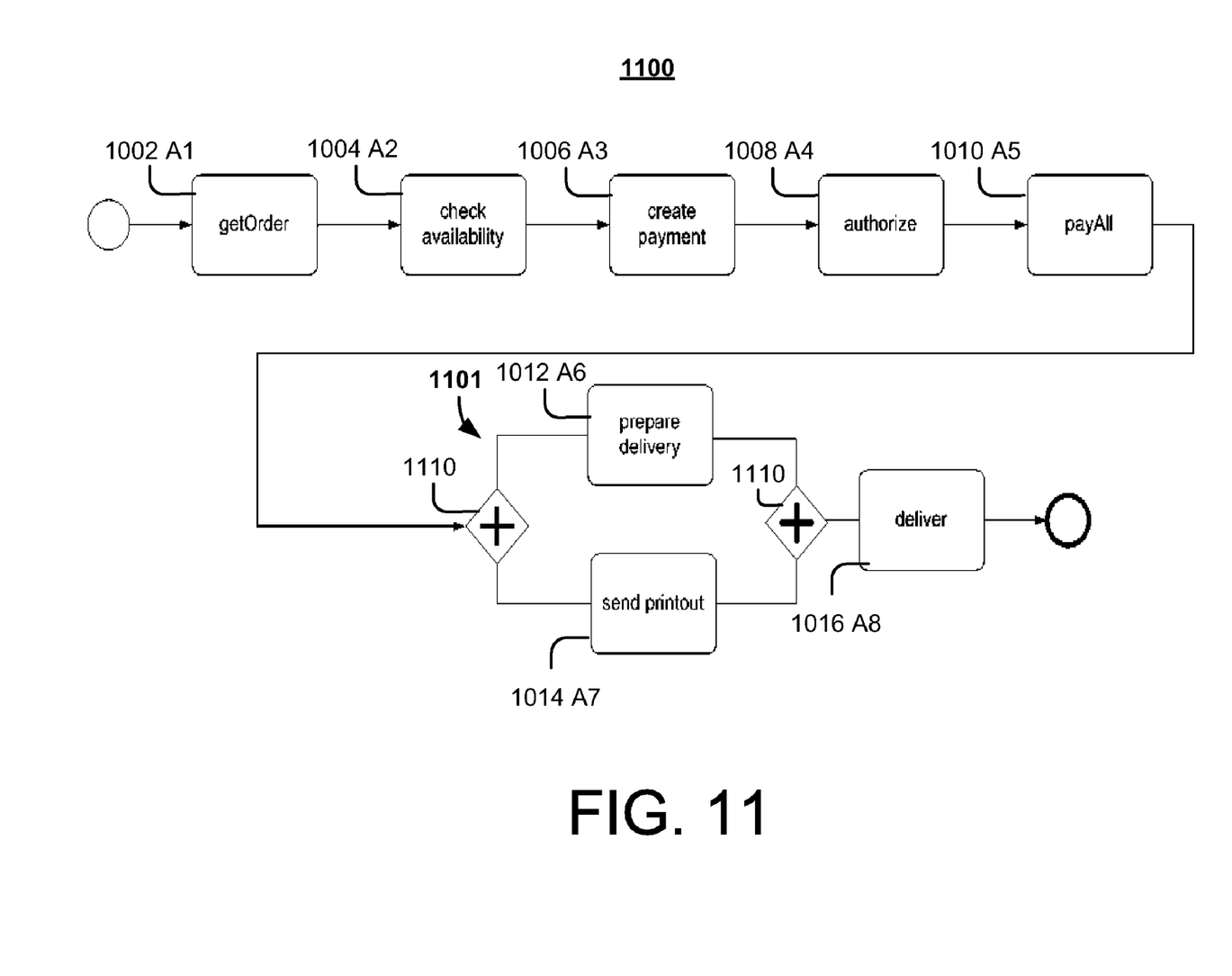
FIG. 11 is a portion of an exemplary business process model with a parallel process fragment generated from the sequentially ordered business process model of FIG. 10 using the system of FIG. 1.

Referring to FIG. 11, an example portion of a new process model 1100 with parallel control flow is illustrated. The business process model 1100 includes the parallel process fragment 1101 that was generated when the business process model 1000 of FIG. 10 was recomposed using system 100 of FIG. 1 and process 300 of FIG. 3. The parallel process fragment includes parallel actions A6 1012 "prepare delivery" and A7 1014 "send printout". The parallel process fragment 1101 also includes a set of parallel control flow nodes 1110. The recomposition of the totally sequentially ordered business process model into a business process model that includes parallel flow control may provide increased flexibility and increased efficiency.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A system including instructions recorded on a non-transitory computer-readable storage medium and executable by at least one processor, the system comprising:
   a composition engine that is arranged and configured to include:
      a receiving engine that is arranged and configured to receive a series of states and transitions from an object lifecycle;
      a computation engine that is arranged and configured to:
         compute actions from the transitions; and
         compute preconditions and effects for the actions from the states;
      a relations engine that is arranged and configured to compute relations between the actions; and
      a parallel process engine that is arranged and configured to:
         generate a parallel process fragment using the actions computed from the transitions received from the object lifecycle, using the preconditions and the effects for the actions computed from the states received from the object lifecycle, wherein the parallel process fragment includes at least two of the actions based on the relations between the actions, determining that two of the actions belong to a same object, and determining that each of the two actions are direct predecessor actions of each other based on the computed relations between the actions; and
         recompose, using the parallel process fragment, a totally sequentially ordered business process model into a business process model that includes parallel control flow.

2. The system of claim 1 wherein the parallel process engine is arranged and configured to generate the parallel process fragment, the parallel process fragment including:
   a set of the actions;
   a set of parallel control flow nodes;
   a set of input states using the preconditions; and
   a set of output states using the effects.

3. The system of claim 1 wherein the parallel process engine is further arranged and configured to generate a process model that includes the parallel process fragment.

4. The system of claim 1 wherein the parallel process engine is further arranged and configured to generate a process model that includes the actions, the preconditions, the effects and the parallel process fragment.

5. The system of claim 1 wherein the parallel process engine is arranged and configured to generate the parallel process fragment by determining that a first action and a sequentially ordered series of other actions belong to a same object lifecycle and determining that the first action and the sequentially ordered series of other actions are direct predecessor actions of each other based on the computed relations between the actions.

6. The system of claim 1 wherein the parallel process engine is arranged and configured to generate the parallel process fragment by determining that more than two actions belong to a same object lifecycle and determining that each of the more than two actions are direct predecessor actions of each other based on the computed relations between the actions.

7. The system of claim 1 wherein the parallel process engine is arranged and configured to generate the parallel process fragment by determining that a first action belongs to a first object lifecycle and a second action belongs to a second object lifecycle and determining that no dependencies exist between at least the first action and other actions of the second object lifecycle based on the computed relations between the actions.

8. A computer program product for generating parallel process fragments for a process model, the computer program product being tangibly embodied on a non-transitory computer-readable storage medium and including executable code that, when executed, is configured to cause at least one data processing apparatus to execute a composition engine, the composition engine configured to:
- receive a series of states and transitions from an object lifecycle;
- compute actions from the transitions;
- compute preconditions and effects for the actions from the states;
- compute relations between the actions;
- generate a parallel process fragment using the actions computed from the transitions received from the object lifecycle, using the preconditions and the effects for the actions computed from the states received from the object lifecycle, wherein the parallel process fragment includes at least two of the actions based on the relations between the actions, determining that two of the actions belong to a same object lifecycle, and determining that each of the two actions are direct predecessor actions of each other based on the computed relations between the actions; and
- recompose, using the parallel process fragment, a totally sequentially ordered business process model into a business process model that includes parallel control flow.

9. The computer program product of claim 8 wherein the composition engine is arranged and configured to generate the parallel process fragment, the parallel process fragment including:
- a set of the actions;
- a set of parallel control flow nodes;
- a set of input states using the preconditions; and
- a set of output states using the effects.

10. The computer program product of claim 8 wherein the composition engine is further arranged and configured to generate a process model that includes the parallel process fragment.

11. The computer program product of claim 8 wherein the composition engine is further arranged and configured to generate a process model that includes the actions, the preconditions, the effects and the parallel process fragment.

12. The computer program product of claim 8 wherein the composition engine is arranged and configured to generate the parallel process fragment by determining that a first action and a sequentially ordered series of other actions belong to a same object lifecycle and determining that the first action and the sequentially ordered series of other actions are direct predecessor actions of each other based on the computed relations between the actions.

13. The computer program product of claim 8 wherein the composition engine is arranged and configured to generate the parallel process fragment by determining that more than two actions belong to a same object lifecycle and determining that each of the more than two actions are direct predecessor actions of each other based on the computed relations between the actions.

14. The computer program product of claim 8 wherein the composition engine is arranged and configured to generate the parallel process fragment by determining that a first action belongs to a first object lifecycle and a second action belongs to a second object lifecycle and determining that no dependencies exist between at least the first action and other actions of the second object lifecycle based on the computed relations between the actions.

15. A computer-implemented method for causing at least one processor to execute instructions recorded on a non-transitory computer-readable storage medium, the method comprising:
- receiving a series of states and transitions from an object lifecycle;
- computing actions from the transitions;
- computing preconditions and effects for the actions from the states;
- computing relations between the actions;
- generating a parallel process fragment using the actions computed from the transitions received from the object lifecycle, using the preconditions and the effects for the actions computed from the states received from the object lifecycle, wherein the parallel process fragment includes at least two of the actions based on the relations between the actions, determining that two of the actions belong to a same object lifecycle, and determining that each the two actions are direct predecessor actions of each other based on the computed relations between the actions; and
- recomposing, using the parallel process fragment, a totally sequentially ordered business process model into a business process model that includes parallel control flow.

16. The method as in claim 15 wherein generating the parallel process fragment includes generating the parallel process fragment, the parallel process fragment including:
- a set of the actions;
- a set of parallel control flow nodes;
- a set of input states using the preconditions; and
- a set of output states using the effects.

17. The method as in claim 15 further comprising generating a process model that includes the parallel process fragment.

* * * * *